United States Patent
Liu et al.

(10) Patent No.: US 10,145,343 B2
(45) Date of Patent: Dec. 4, 2018

(54) SYSTEMS AND METHODS FOR REGENERATION OF A DIESEL OXIDATION CATALYST IN A DUAL-FUEL ENGINE

(71) Applicant: Cummins Emission Solutions, Inc., Columbus, IN (US)

(72) Inventors: Yi Liu, Columbus, IN (US); Justin Kruer, Franklin, IN (US); Rahul B. Kallurwar, Columbus, IN (US); Arvind V. Harinath, Columbus, IN (US); Zheng Liu, Knoxville, TN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/711,505

(22) Filed: May 13, 2015

(65) Prior Publication Data

US 2016/0333761 A1 Nov. 17, 2016

(51) Int. Cl.
*F01N 3/20* (2006.01)
*F02M 43/00* (2006.01)
*F01N 3/10* (2006.01)
*F02D 19/06* (2006.01)
*F01N 13/00* (2010.01)
(Continued)

(52) U.S. Cl.
CPC ............. *F02M 43/00* (2013.01); *F01N 3/103* (2013.01); *F01N 3/2006* (2013.01); *F01N 3/2066* (2013.01); *F01N 13/009* (2014.06); *F02D 19/06* (2013.01); *F02D 41/0025* (2013.01); *F02D 41/027* (2013.01); *F02D 41/0245* (2013.01); *F02D 41/0295* (2013.01); *Y02T 10/24* (2013.01); *Y02T 10/26* (2013.01); *Y02T 10/36* (2013.01)

(58) Field of Classification Search
CPC ...... F01N 13/009; F01N 3/103; F01N 3/2006; F01N 3/2066; F02D 19/06; F02D 41/0025; F02D 41/0245; F02D 41/027; F02D 41/0295; F02M 43/00
See application file for complete search history.

(56) References Cited

U.S. PATENT DOCUMENTS 7,906,085 B2    3/2011  Li et al.
2003/0140616 A1*  7/2003  Twigg ............... B01D 53/9431
                                                  60/275

(Continued)

FOREIGN PATENT DOCUMENTS

CA    2422164    4/2004
CA    2453689    9/2004
(Continued)

*Primary Examiner* — Brandon Lee
(74) *Attorney, Agent, or Firm* — Foley & Lardner LLP

(57) ABSTRACT

A timing-based method for regenerating a DOC included in an aftertreatment system fluidly coupled to a dual-fuel engine comprises performing at least one of the following: a temperature of the DOC is varied while flowing a mixed exhaust gas, which comprises a mixture of a diesel-only exhaust gas and a natural gas exhaust gas, generated by the dual-fuel engine through the DOC; alternately the method includes flowing (a) the mixed exhaust gas generated by the dual-fuel engine and (b) a diesel-only exhaust gas generated by the dual-fuel engine through the DOC.

21 Claims, 11 Drawing Sheets

(51) Int. Cl.
*F02D 41/02* (2006.01)
*F02D 41/00* (2006.01)

(56) References Cited

U.S. PATENT DOCUMENTS

| | | | |
|---|---|---|---|
| 2005/0198945 A1* | 9/2005 | Okugawa | F02D 41/029 60/295 |
| 2010/0147262 A1* | 6/2010 | Martin | F02D 19/0647 123/299 |
| 2011/0126528 A1* | 6/2011 | Yamada | B01D 53/9468 60/299 |
| 2012/0042637 A1* | 2/2012 | Roozenboom | F01N 3/035 60/297 |

FOREIGN PATENT DOCUMENTS

| | | | |
|---|---|---|---|
| EP | 1 604 099 | 12/2005 | |
| WO | WO 2004053313 A1 * | 6/2004 | F01N 3/2053 |
| WO | WO-2004/101962 | 11/2004 | |

* cited by examiner

SYSTEMS AND METHODS FOR REGENERATION OF A DIESEL OXIDATION CATALYST IN A DUAL-FUEL ENGINE

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$).

Dual-fuel engines can operate on multiple fuels, for example, diesel, natural gas and/or a mixture thereof. When operating in dual-fuel mode under lean conditions, for example on a mixture of diesel and natural gas, the dual-fuel engine emits a higher quantity of unburnt short-chain hydrocarbons such as methane, ethane, propane etc. in the engine exhaust gas. This requires the aftertreatment system to reduce short-chain saturated hydrocarbon during the dual-fuel mode to meet stringent emission regulations (e.g., Tier 4 emission regulations). Such aftertreatment systems often include a diesel oxidation catalyst (DOC) which can include a platinum (Pt) group DOC, for example a palladium (Pd) based DOC. The Pd DOC tends to oxidize at the high temperature of the exhaust gas to convert to palladium oxide (e.g., PdO and $PdO_2$).

While a certain stoichiometric ratio of Pd:Pd Oxides provides optimal catalytic conversion efficiency, shifting of the stoichiometric ratio of the catalyst towards Pd oxides can degrade the catalyst. The performance of such Pd based catalysts degrades with time both in non-sulfated and sulfated exhaust gases. Furthermore, the water content of the exhaust gas emitted by the engine operating in dual-fuel mode is higher (e.g., 12% of the exhaust gas volume) relative to the water content of the exhaust gas emitted by the engine while operating on diesel only (e.g., 8% of the exhaust gas volume), which also can contribute to oxidation of the Pd catalyst.

SUMMARY

Embodiments described herein relate generally to systems and methods for regenerating a DOC which can include a Pd based catalyst. Particularly, in various embodiments, systems and methods described herein for regenerating a DOC included in an aftertreatment system fluidly coupled to a dual-fuel engine comprise timing the varying of a temperature of the DOC, or alternately flowing a mixed exhaust gas which includes a mixture or a diesel-only exhaust gas and a natural gas, and a diesel-only exhaust gas through the DOC, or any combination thereof.

In a first set of embodiments, a timing-based method for regenerating a DOC included in an aftertreatment system fluidly coupled to a dual-fuel engine comprises performing at least one of the following: varying a temperature of the DOC is varied while flowing a mixed exhaust gas, which comprises a mixture of a diesel-only exhaust gas and a natural gas exhaust gas, generated by the dual-fuel engine through the DOC, and flowing (a) the mixed exhaust gas generated by the dual-fuel engine through the DOC and (b) a diesel-only exhaust gas generated by the dual-fuel engine through the DOC.

In another set of embodiments, an apparatus comprises a dual-fuel engine configured to operate on diesel and natural gas, a fuel insertion assembly and an aftertreatment system fluidly coupled to the engine. The aftertreatment system includes a DOC, a temperature sensor, and a heater. A controller is in electrical communication with the fuel insertion assembly, the temperature sensor and the heater. The controller is configured to regenerate the DOC by performing at least one of: varying a temperature of the DOC while a mixed exhaust gas generated by the dual-fuel engine is flowing through the DOC; and instructing the fuel insertion assembly to alternately (a) insert a mixture of natural gas and diesel at a predetermined ratio into the dual-fuel engine to generate the mixed exhaust gas which flows through the DOC, and (b) insert diesel into the dual fuel engine to produce diesel-only exhaust gas which flows through the DOC.

In yet another set of embodiments, a control module comprises a temperature sensing module configured to measure a temperature of a diesel oxidation catalyst (DOC) included in an aftertreatment system fluidly coupled to a dual-fuel engine. The control module is configured to regenerate the DOC by performing at least one of: providing instructions to a heater operatively coupled to the DOC to vary a temperature of the DOC while a mixed exhaust gas generated by the dual-fuel engine is flowing through the DOC; and providing instructions to a fuel insertion assembly of the dual-fuel engine to alternately (a) insert a mixture of natural gas and diesel at a predetermined ratio into the dual-fuel engine to generate a mixed exhaust gas which flows through the DOC, and (b) insert diesel into the dual-fuel engine to produce diesel-only exhaust gas which flows through the DOC.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
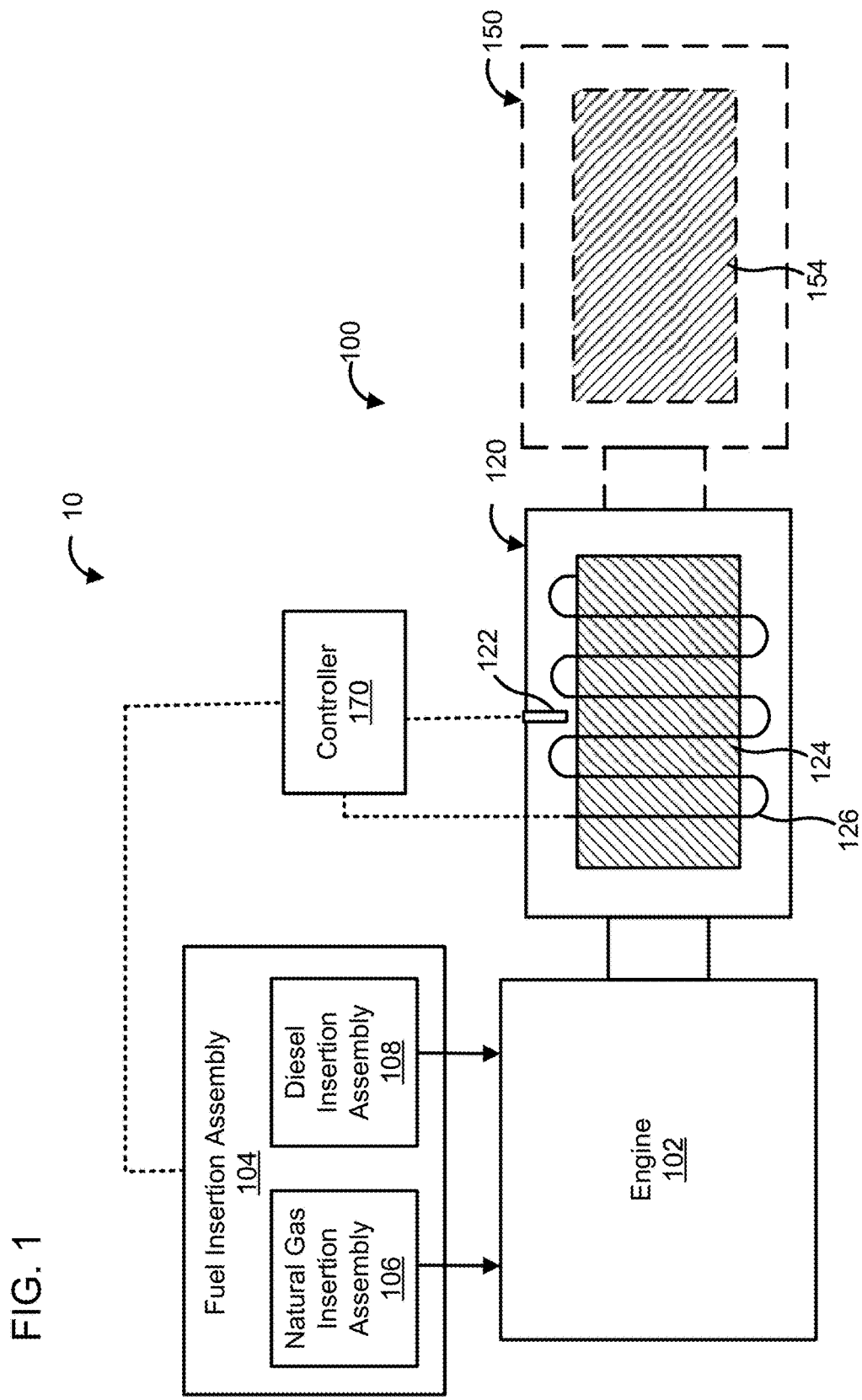
FIG. 1 is a schematic block diagram of a system which includes a dual-fuel engine and an aftertreatment system for treating an exhaust gas produced by the dual-fuel engine, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for regenerating a DOC which can include a Pd based catalyst. Particularly, in various embodiments, systems and methods described herein for regenerating a DOC included in an aftertreatment system fluidly coupled to a dual-fuel engine comprise at least one of (1) varying of a temperature of the DOC, and (2) alternately flowing a mixed exhaust gas which includes a mixture or a diesel-only exhaust gas and a natural gas, and a diesel-only exhaust gas through the DOC, or any combination thereof.

Various embodiments of the systems and methods for regenerating a DOC catalyst included in an aftertreatment system of a dual fuel engine described herein may provide benefits including, for example: (1) allowing regeneration of a DOC catalyst by timing the varying of a temperature of the DOC; (2) allowing the regeneration of the DOC by alternately flowing a mixed exhaust gas and a diesel-only exhaust gas through the DOC for predetermined amounts of time; (3) obviating the use of conventionally employed hydrocarbon insertion systems which insert a hydrocarbon in the DOC to regenerate the DOC; (4) enabling regeneration of the DOC while the only operates solely under lean conditions, obviating the need for lean/rich cycles commonly used for regenerating the DOC; and (5) allowing integration of the systems and methods described herein with conventional systems without significant modifications to the conventional systems.

FIG. 1 is a schematic illustration of a system 10 which includes a dual-fuel engine 102 (also referred to herein as "the engine 102") and an aftertreatment system 100 fluidly coupled to the engine 102 to receive an exhaust gas from the engine 102 and decompose hydrocarbons and/or NOx gases included in the exhaust gas.

The engine 102 includes a dual-fuel engine configured to operate on a mixture of diesel and natural gas, or only on diesel. When operating on a mixture of natural gas and diesel, the engine 102 generates a mixed exhaust gas which includes a mixture of a diesel-only exhaust gas and a natural gas exhaust gas. Similarly, the engine 102 generates a diesel-only exhaust gas when operating on diesel alone. The mixed exhaust gas or the diesel-only exhaust gas is fluidly communicated to the aftertreatment system 100 for decomposing the constituents of the exhaust gas, as described herein.

A fuel insertion assembly 104 is fluidly coupled to the engine 102. The fuel insertion assembly 104 includes a natural gas insertion assembly 106 and a diesel insertion assembly 108, configured to insert natural gas and diesel, respectively into the engine 102. The fuel insertion assembly 104 can include fuel injectors, pumps, nozzles, conduits and/or other components for inserting the natural gas and/or diesel into the engine 102. The natural gas insertion assembly 106 can be fluidly coupled to a reservoir of natural gas (e.g., a methane cylinder), and the diesel insertion assembly 108 can be fluidly coupled to a diesel reservoir (e.g., a diesel tank).

The fuel insertion assembly 104 is configured to insert fuel (e.g., a mixture of diesel and natural gas, or only diesel gas) and air at a predetermined ratio, i.e., a predetermined air-fuel ratio into the engine 102, for example based on instructions from the controller 170, as described herein. In some embodiments, the fuel insertion assembly 104 is configured to insert a lean mixture of the air and fuel into the engine 102. While operating in dual-fuel mode (i.e., operating on the mixture of natural gas and diesel), the engine 102 generates the mixed exhaust gas. The mixed exhaust gas can have a higher content of unburnt hydrocarbons such as methane, ethane and propane, relative to a diesel-only exhaust gas. Furthermore, the mixed exhaust gas can have a higher water content, for example about 12% water in the mixed exhaust gas, relative to the diesel-only exhaust gas, for example about 8% water in the diesel-only exhaust gas.

The aftertreatment system 100 is configured to receive the mixed exhaust gas or the diesel-only exhaust gas from the engine 102 and decompose constituents of the exhaust gas. The aftertreatment system 100 includes a DOC 120 including a catalyst 124 positioned therein. The catalyst 124 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 124. Such washcoat materials can include, for example, aluminum oxide, titanium dioxide, silicon dioxide, any other suitable washcoat material, or a combination thereof.

The DOC 120 is configured to decompose one or more unburnt hydrocarbons, for example, methane, propane, ethane, etc. included in the mixed exhaust gas or diesel-only exhaust gas. The DOC 120 can include a Pt group catalyst. In one embodiment, the DOC 120 includes a Pd—PdO catalyst. For example, the DOC 120 can originally include a Pd catalyst which oxidizes during operation the aftertreatment system 100 to yield the Pd—PdO DOC 120.

Both Pd and PdO included in the DOC 120 can contribute to the decomposition of the hydrocarbons. For example, the Pd in the DOC 120 provides superior absorption of the hydrocarbons on the DOC 120, while the PdO contributes to decomposing the C—H bonds of the hydrocarbons. Therefore, a suitable Pd to Pd oxides ratio is important in maintaining DOC 120 catalytic conversion efficiency or otherwise performance for reducing hydrocarbons. While Pd oxidation to Pd oxides is a kinetic process, Pd oxides decomposition to Pd is a thermodynamic process. Therefore, the Pd oxides decomposition to Pd can be controlled by adjusting a temperature of the Pd, as described herein. Furthermore, oxidation of Pd to Pd oxides can be a function of the humidity, moisture or otherwise water content of the exhaust gas and can therefore, be controlled by adjusting a moisture content of the exhaust gas flowing through the DOC 120, as described herein.

A temperature sensor 122 is positioned within the DOC 120 and is configured to measure a temperature of the DOC 120. The temperature sensor 122 can include a thermocouple, a thermistor, a RTD or any other temperature sensor. In some embodiments, a heater 126 can also be operatively coupled to the DOC 120 and configured to adjust or otherwise maintain a temperature of the DOC 120. The heater 126 can include, for example, an electric heater such as an induction heater, a resistive heater, or an infra-red heater. In various embodiments, the temperature sensor 122 and the heater 126 are electrically coupled to the controller 170 in a feedback loop. The controller 170 can interpret the temperature sensor 122 readings, and based on the readings operate the heater 126 to increase the temperature or maintain the temperature of the DOC 120 as described herein.

In particular embodiments, the heater 126 is excluded, and another heat source can be used to heat and/or maintain the temperature of the DOC 120. For example, engine heat, which can reach a temperature of up to 600 degrees Celsius, can serve as the heat source for heating the DOC 120 to the regeneration temperature.

The aftertreatment system 100 also includes a controller 170. The controller 170 is in electrical communication with the fuel insertion assembly 104, the temperature sensor 122 and the heater 126. The controller 170 is configured to regenerate the DOC 120 by performing at least one of the following operations: (1) varying a temperature of the DOC 120 while the mixed exhaust gas is flowing through the DOC 120, and (2) alternately instruct the fuel insertion assembly 104 to (a) insert a mixture of natural gas and diesel at a predetermined ratio into the dual-fuel engine 102 to generate the mixed exhaust gas which flows through the DOC 120, and (b) insert diesel into the dual fuel engine 102 to produce diesel-only exhaust gas which flows through DOC 120.

For example, the controller 170 is configured to regenerate the DOC 120 by varying the temperature of the DOC 120. In some embodiments, the varying of the temperature of the DOC 120 by the controller 170 includes maintaining the DOC 120 at an operating temperature for a first time. For example, the operating temperature of the DOC 120 at which the DOC has optimal catalytic conversion efficiency, for example, less than 550 degrees Celsius or up to 550 degrees Celsius. Operation at this temperature for a period of time leads to increasing oxidation of the Pd to PdO such that the ratio of the PdO to Pd in the DOC 120 increases. This leads to a decrease in the catalytic conversion efficiency of the DOC 120 over time. In some embodiments, the first time is 1 minute, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween. In one embodiment, the first time is 60 minutes.

The controller 170 then heats the DOC 120 to a regeneration temperature at a first temperature ramp rate. The regeneration temperature is a temperature at which the PdO included in the DOC 120 reduces back to Pd thereby, regenerating the DOC 120. In particular embodiments, the regeneration temperature is higher than the oxidation temperature of the DOC 120 (e.g., the Pd included in the DOC 120) but lower than a decomposition temperature of the DOC 120 i.e., the temperature at or above which the Pd completely degrades and can no longer be used (e.g., greater than 950 degrees Celsius). Furthermore, the regeneration temperature is also higher than the operating temperature of the DOC 120. In some embodiments, the regeneration temperature can be higher than 550 degrees Celsius but lower than the decomposition temperature of the DOC 120. For example, the regeneration temperature can be 560 degrees Celsius, 600 degrees Celsius, 650 degrees Celsius, 700 degrees Celsius, 750 degrees Celsius or 800 degrees Celsius inclusive of all ranges and values therebetween. In one embodiment, the regeneration temperature is 600 degrees Celsius. The controller 170 can also be configured to vary the first temperature ramp rate, for example, to minimize thermal stress on the DOC 120 by providing a slow ramp up of the temperature to the regeneration temperature.

The controller 170 maintains the DOC 120 at the regeneration temperature for a second time. The maintaining at the regeneration temperature decomposes the PdO to Pd thereby regenerating the DOC 120. The second time can be varied to ensure that only enough PdO decomposes to Pd that a beneficial ratio of the Pd to PdO is maintained or achieved. In some embodiments, the second time is 10 seconds, 20 seconds, 30 second, 1, minute, 2 minutes, 5 minutes, 10 minutes, 15 minutes, 20 minutes, 25 minutes or 30 minutes inclusive of all ranges and values therebetween. In one embodiment, the second time can be about 20 minutes. The controller 170 than cools the DOC 120 to the operating temperature at a second temperature ramp rate, for example, a temperature of less than 550 degrees Celsius. The second temperature ramp rate can be varied, for example to prevent thermal stress on the catalyst and/or to allow gases generated during the regeneration phase to escape from the DOC 120.

In particular embodiments, the controller 170 instructs the heater 126 to heat, cool or otherwise maintain the temperature of the DOC 120, as described above. In other embodiments, the controller 170 is configured to heat the DOC 120 to the regeneration temperature by instructing the fuel insertion assembly 104 to vary an air to natural gas ratio, an air to diesel ratio, and/or a natural gas to diesel ratio inserted into the engine 102. In other embodiments, the controller 170 can be configured to vary the first time, the second time, the first temperature ramp rate and the second temperature ramp rate based on an age of the DOC 120, the operating state of the engine 102 (e.g., low load, high load or steady state load) or emission requirements of a region in which the system 10 is operating.

In various embodiments, the operating temperature can be determined by flowing hydrogen or carbon monoxide over the DOC 120 at the operating temperature. The DOC 120 is purged with inert gas at the operating temperature to clean the surface physisorbed species, for example surface physisorbed hydrocarbons. The mixed exhaust gas containing hydrocarbons is then flown over the DOC 120 at the operating temperature for a predetermined time and the catalytic conversion efficiency of the DOC 120 is recorded. This process is repeated a number of times to determine the range of maximum catalytic conversion efficiency of the DOC 120. This value can, for example, be stored in a lookup table included in the controller 170.

In other embodiments, the first time i.e., the time in which the catalytic conversion efficiency of the DOC 120 drops from the maximum catalytic conversion efficiency to a minimum value, can be determined by maintaining the DOC 120 at the operating temperature in air for certain period of time. The mixed exhaust gas containing hydrocarbons is flown over the DOC 120 until the catalytic conversion efficiency drops to the minimum value as required. The time period for this is recorded and can be the first time.

In still other embodiments, the second time i.e., the time interval to maintain the DOC 120 at the regeneration temperature to regenerate the DOC 120, can be determined by flowing the mixed exhaust gas including hydrocarbons over the DOC 120 at the operating temperature until the catalytic conversion efficiency of the DOC 120 drops to the minimum value. The DOC 120 is purged with inert gas (e.g., nitrogen) at the operating temperature to clean the surface physisorbed species or otherwise the physisorbed hydrocarbons. The DOC 120 temperature is increased to the regeneration temperature a certain ramp-up rate (e.g., the first temperature ramp rate), and the DOC 120 is held at the regeneration temperature for a certain period of time, for example, the second time.

In various embodiments, the catalytic conversion efficiency of the DOC 120 and the operating times and the regeneration times (e.g., the first time and the second time) can be adjusted by any one of varying the DOC 120 loading (e.g., the Pd:PdO loading), Pt to Pd ratios in the DOC 120, inclusion of additives, changing DOC support materials, varying operating temperatures and varying exhaust gas flow velocity.

As described before, the controller 170 can also be configured to instruct the fuel insertion assembly 104 to alternately (a) insert a mixture of natural gas and diesel at a predetermined ratio into the dual-fuel engine 102 to generate the mixed exhaust gas which flows through the DOC 120, and (b) insert diesel into the dual fuel engine 102 to produce diesel-only exhaust gas which subsequently flows into the DOC 120. For example, the controller 170 can instruct the fuel insertion assembly 104 to insert a predetermined ratio of the natural gas and diesel into the engine 102 for a first time. In some embodiments, the first time is 1 minute, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween. In one embodiment, the first time is 60 minutes. The mixed exhaust gas has a first water content, for example 8% by volume. The mixed exhaust gas flows through the DOC 120 for the first time, the DOC 120 while the DOC 120 is maintained at the operating temperature (e.g., at a temperature of less than 550 degrees Celsius).

The controller 170 can the instruct the fuel insertion assembly 104 to insert diesel 102 into the engine for a second time. In some embodiments, the second time is 10 seconds, 20 seconds, 30 second, 1, minute, 2 minutes, 5 minutes, 10 minutes, 15 minutes, 20 minutes, 25 minutes or 30 minutes inclusive of all ranges and values therebetween. In one embodiment, the second time can be about 20 minutes. This causes the engine 102 to produce a diesel-only exhaust gas having a second water content (e.g., 8% by volume) lower than the first water content. The diesel-only exhaust gas flows through the DOC 120 for the second time while the DOC 120 is maintained at the operating temperature.

Expanding further, the mixed exhaust gas has a higher water content and a higher hydrocarbon content relative to the diesel-only exhaust gas. This promotes the oxidation of Pd of the DOC 120 to PdO which leads to degradation of the DOC 120. Flowing the diesel-only exhaust gas having the lower water content and lower hydrocarbon content can promote the reduction of PdO to Pd thereby regenerating the DOC 120 as described before herein. In other embodiments, the controller 170 can be configured to vary the first time, the second time, the first temperature ramp rate and the second temperature ramp rate based on an age of the DOC 120, the operating state of the engine 102 (e.g., low load, high load or steady state load) or emission requirements of a region in which the system 10 is operating.

In various embodiments, the maximum catalytic conversion efficiency of the DOC 120 in the diesel-only mode can be quantified by flowing the mixed exhaust gas over DOC 120 at diesel-only mode for certain period of time and recording the catalytic conversion efficiency of the DOC 120. Furthermore, a minimum catalytic conversion of the DOC 120 in the dual-fuel mode can be based on the technical profiles or system requirements.

In other embodiments, the time interval of catalytic conversion efficiency of the DOC 120 drops from maximum value to the minimum value, i.e., the first time can be obtained by flowing the hydrocarbon over Pd-based oxidation catalyst in diesel mode. The engine 102 is then switched to dual-fuel mode, and the mixed exhaust gas is flown over DOC 120 in the dual-fuel mode until the catalytic conversion efficiency of drops to the minimum catalytic conversion efficiency and the time recorded. The time interval to hold the catalyst at the diesel-only mode, i.e., the second time, can be obtained by flowing mixed exhaust gas over the DOC 120 in dual-fuel mode until the minimum catalytic conversion efficiency is obtained. The engine 102 is then switched to diesel-only mode and the period of time is recorded.

In some embodiments, the controller 170 can be configured to regenerate the DOC 120 by performing a combination of varying the temperature of the DOC 120 as well as, instructing the fuel insertion assembly 104 to alternately (a) insert a mixture of natural gas and diesel at a predetermined ratio into the dual-fuel engine 102 to generate the mixed exhaust gas which flows through the DOC 120, and (b) insert diesel into the dual fuel engine 102 to produce diesel-only exhaust gas which subsequently flows through the DOC 120. In such embodiment, the DOC 120 can be maintained at the operating temperature or the regeneration temperature when the mixed exhaust or the diesel-only exhaust gas is flown through the DOC 120. Examples of such combinations are described in the timing diagrams of FIGS. 3-7 but any other combinations are within the scope of this disclosure.

In various embodiments, the aftertreatment system 100 can also include a SCR system 150 which can be positioned upstream or downstream of the DOC 120. The SCR system 150 is configured to receive and decompose constituents (e.g., NOx) of the exhaust gas (e.g., the mixed exhaust gas and the a diesel-only exhaust gas) flowing through the SCR system 150. The SCR system 150 can be fluidly coupled to an exhaust reductant tank (not shown) and configured to receive an exhaust reductant (e.g., a diesel-only exhaust fluid such as an aqueous urea solution) therefrom. The exhaust reductant can be formulated to facilitate decomposition of the constituents of the exhaust gas. The SCR system 150 includes at least one catalyst 154. The catalyst 154 is formulated to selectively reduce constituents of the exhaust gas, for example, NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that any NOx gases included in the exhaust gas are further reduced to yield an exhaust gas which is substantially free of carbon monoxide and NOx gases.

The controller 170 can include a processor (e.g., a microcontroller) programmed to interpret the output signal. In some embodiments, the controller 170 can be included in a control module (e.g., the control module 271 described herein) which is in electrical communication one or more of the components of the system 10 as, described herein and operable to perform the sensing and control functions described herein. In particular embodiments, the controller 170 can also be configured to receive and interpret data from, temperature sensors, NOx sensors, oxygen sensors and/or ammonia sensors, each of which can be included in the aftertreatment system 100.

The controller 170 can include look up tables, algorithms or instructions, which can be stored on a computer-readable medium included in the controller 170. The instructions or algorithms on the computer-readable medium are executable by a computing device (e.g., the computing device 530) of the controller 170 (e.g., the microprocessor) vary the temperature of the DOC 120 and/or to instruct the fuel insertion assembly 104 to alternately (a) insert a mixture of natural gas and diesel at a predetermined ratio into the dual-fuel engine 102 to generate the mixed exhaust gas, and (b) insert diesel into the dual fuel engine 102 to produce diesel-only exhaust gas. In particular embodiments, the controller 170 can also include algorithms or look up tables to compare the first filter response signal and the second filter response signal with the first threshold and the second threshold, respectively to determine if an improper reductant is present in the storage tank 110 and/or the catalyst 154 has failed.

Figure 2:
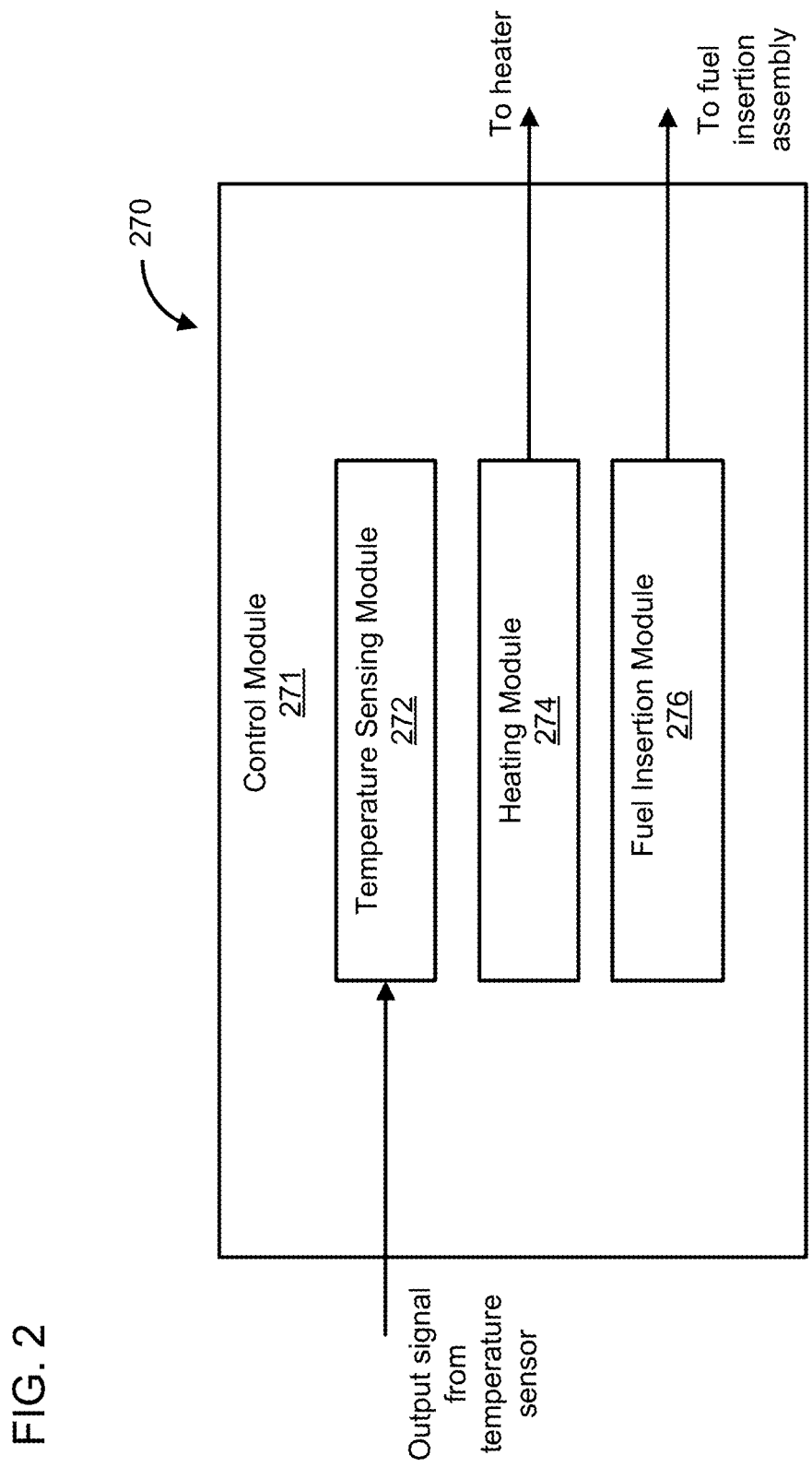
FIG. 2 is a schematic block diagram of an embodiment of a control module which can be included in the aftertreatment system of FIG. 1.

In some embodiments, the controller 170 can be a system computer of an apparatus or system (e.g., the system 10) which includes the aftertreatment system 200 (e.g., a vehicle, generator set, etc.). Such a computer can include, for example the computing device 530 described in detail herein with respect to FIG. 11. In particular embodiments, the controller 170 can include a control module which is in electrical communication with one or more of the components of the system 10 described herein and operable to perform the sensing functions described herein. For example, FIG. 2 is a schematic block diagram of a control module 271 included in a controller 270. The control module 271 includes a temperature sensing module 272, a heating module 274, and a fuel insertion module 276.

The temperature sensing module 272 is configured to receive an output signal from a temperature sensor, for example, the temperature sensor 222 to determine a temperature of a DOC, for example, the DOC 120 included in the aftertreatment system 100. The DOC is included in an aftertreatment system (e.g., the aftertreatment system 100) which is fluidly coupled to a dual-fuel engine (e.g. the engine 102) and configured to receive an exhaust gas from the engine. The DOC 120 can include a Pd—PdO catalyst.

The control module 271 also includes a heater module 274 configured to control an operation of a heater (e.g., the heater 126) operatively coupled to the DOC. Furthermore, the control module 271 includes a fuel insertion module 276 which is configured to control the operation of a fuel insertion assembly (e.g., the fuels insertion assembly 104) operatively coupled to the dual-fuel engine. The control module 271 is configured to regenerate the DOC by performing at least one of the following operations: while a mixed exhaust gas generated by the dual-fuel engine is flowing through the DOC, the heater module 274 instructs the heater operatively coupled to the DOC to vary a temperature of the DOC; or the fuel insertion module 276 instructs fuel insertion assembly of the dual-fuel engine to alternately (a) insert a mixture of natural gas and diesel at a predetermined ratio into the dual-fuel engine to generate a mixed exhaust gas which flows through the DOC, and (b) insert diesel into the dual-fuel engine to produce diesel-only exhaust gas which flows through the DOC.

Expanding further, in some embodiments the control module 271 regenerates the DOC by varying the temperature of the DOC. In such embodiments, the heater module instructs the heater to maintain the DOC at an operating temperature for a first time, as described before herein with respect to the controller 170. For example, the operating temperature of the DOC 120 is a temperature at which the DOC has optimal catalytic conversion efficiency, for example, less than 550 degrees Celsius or up to 550 degrees Celsius. In some embodiments, the first time is 1 minute, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween. In one embodiment, the first time is 60 minutes.

The heating module 274 instructs the heater to heat the DOC to a regeneration temperature at a first temperature ramp rate. The regeneration temperature is higher than an oxidation temperature of the DOC but lower than a decomposition or otherwise degradation temperature of the DOC. For example, the regeneration temperature can be 560 degrees Celsius, 600 degrees Celsius, 650 degrees Celsius, 700 degrees Celsius, 750 degrees Celsius or 800 degrees Celsius inclusive of all ranges and values therebetween. In one embodiment, the regeneration temperature is 600 degrees Celsius. The heater module 274 can also be configured to vary the first temperature ramp rate, for example, to minimize thermal stress on the DOC by providing a slow ramp up of the temperature to the regeneration temperature.

The heating module 274 instructs the heater to maintain the DOC at the regeneration temperature for a second time to allow regeneration of the DOC as described before. In some embodiments, the second time is 10 seconds, 20 seconds, 30 second, 1, minute, 2 minutes, 5 minutes, 10 minutes, 15 minutes, 20 minutes, 25 minutes or 30 minutes inclusive of all ranges and values therebetween. In one embodiment, the second time can be about 20 minutes. The heater module 274 instructs heater to cool the DOC to the operating temperature, for example, a temperature of less than 550 degrees Celsius, at a second temperature ramp rate, for example, by turning the heater off.

In other embodiments, the control module 271 regenerates the DOC by alternately flowing the mixed exhaust gas, and a diesel-only exhaust gas through the DOC. In such embodiments, the fuel insertion module 276 is configured to instruct the fuel insertion assembly to alternately (a) insert a mixture of the natural gas and diesel into the dual-fuel engine, and (b) insert diesel into the dual fuel engine. More specifically, the fuel insertion module 276 instructs the fuel insertion assembly to insert a mixture of the natural gas and diesel into the dual-fuel engine (e.g., the engine 102) for a first time. In some embodiments, the first time is 1 minutes, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween. In one embodiment, the first time is 60 minutes. The mixed exhaust gas has a first water content, for example 8% by volume. The mixed exhaust gas flows through the DOC for the first time, the DOC while the DOC is maintained at the operating temperature (e.g., at a temperature of less than 550 degrees Celsius).

The fuel insertion module 276 then instructs the fuel insertion assembly to insert diesel into the engine for a second time. In some embodiments, the second time is 10 seconds, 20 seconds, 30 second, 1, minute, 2 minutes, 5 minutes, 10 minutes, 15 minutes, 20 minutes, 25 minutes or 30 minutes inclusive of all ranges and values therebetween. In one embodiment, the second time can be about 20 minutes. This causes the engine 102 to produce a diesel-only exhaust gas having a second water content (e.g., 8% by volume) lower than the first water content. The diesel-only exhaust gas flows through the DOC for the second time while the DOC is maintained at the operating temperature, and causes regeneration of the Pd—PdO DOC by reduction of the PdO as described before herein.

In various embodiments, the control module 271 can be configured to regenerate the DOC 120 by performing a combination of varying the temperature of the DOC 120 as well as, instructing the fuel insertion assembly 104 to alternately (a) insert a mixture of natural gas and diesel at a predetermined ratio into the dual-fuel engine 102 to generate the mixed exhaust gas, and (b) insert diesel into the dual fuel engine 102 to produce diesel-only exhaust gas. For example, the heating module 274 and the fuel insertion module 276 can, in series or in parallel, instruct the heater and the fuel insertion assembly to perform any combination of the timing based DOC regeneration as described herein.

In such embodiments, the DOC 120 can be maintained at the operating temperature or the regeneration temperature when the mixed exhaust or the diesel-only exhaust gas is flown through the DOC 120. For example, FIGS. 3-7 show various timing diagrams for regenerating a DOC, for example the DOC 120 via varying the temperature of the DOC, alternately flowing a mixed exhaust gas and diesel only exhaust gas through the DOC, or a combination thereof.

Figure 3:
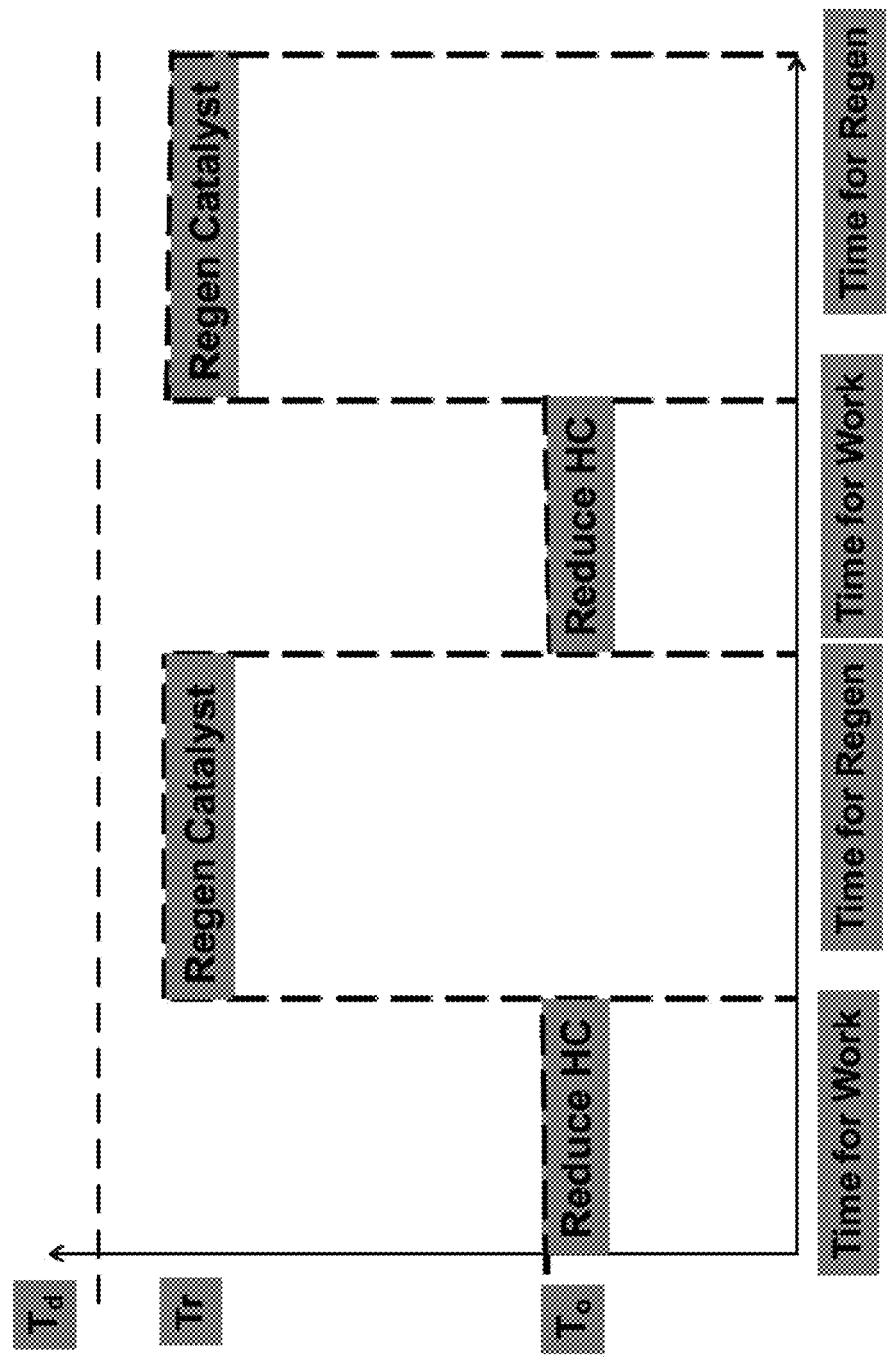
FIG. 3 is a timing diagram for regenerating a DOC by varying the temperature of the DOC.

FIG. 3 is an example of a timing diagram for regenerating the DOC by varying the temperature of the DOC. A mixed exhaust gas is first flown through the DOC at an operating temperature ($T_o$) (e.g., less than about 550 degrees Celsius) of the DOC for a first time (e.g., 60 minutes). During the first time, the hydrocarbons included in the mixed gas are actively oxidized by the DOC which also leads to degradation of the DOC by increasing the ratio of PdO to Pd of the DOC. The temperature of the DOC is now increased to a regeneration temperature ($T_r$) (e.g., about 600 degrees Celsius) while the mixed gas continues to flow through the DOC. The regeneration temperature is less than a decomposition temperature ($T_d$) of the Pd—PdO DOC. The DOC is maintained at the regeneration temperature for a second time (e.g., about 20 minutes) to regenerate the DOC. The DOC is then cooled to the operating temperature and the cycle is repeated. In a particular implementation in which the operating temperature and the regeneration temperature are close (e.g., an operating temperature of 550 degrees Celsius, and a regeneration temperature of 600 degrees Celsius), a fast cycling of the DOC between the operating temperature and the regeneration temperature can be performed.

Figure 4:
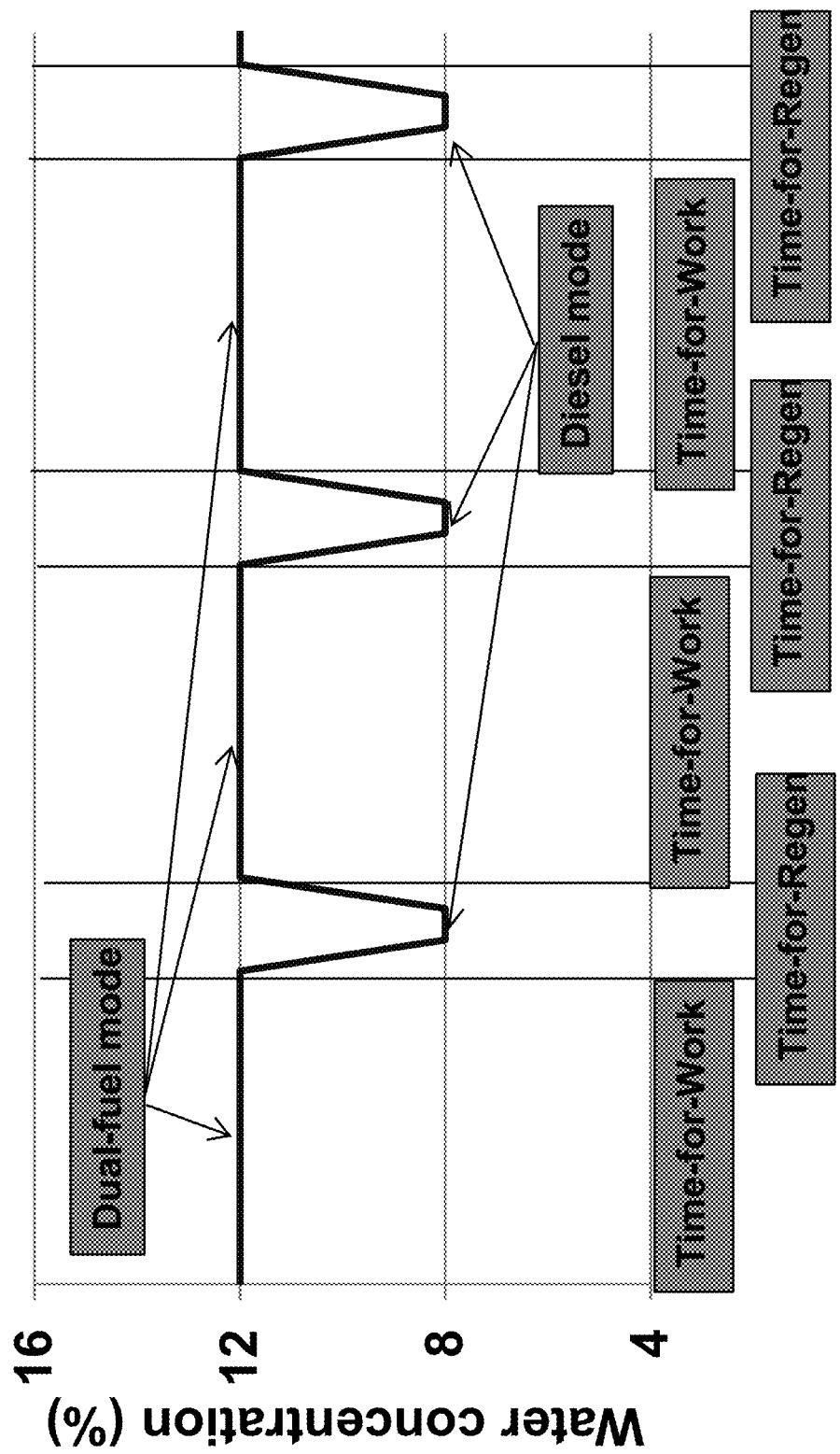
FIG. 4 is another timing diagram for regenerating the DOC by alternately flowing a mixed exhaust gas, and a diesel-only exhaust gas through the DOC.

FIG. 4 is another example of a timing diagram for regenerating the DOC by alternately flowing a mixed exhaust gas and a diesel-only exhaust gas through the DOC. A mixed exhaust gas having a water content of 12% by volume (or approximately 12% by volume) is flown through the DOC while the DOC is maintained at the operating temperature, for a first time (e.g., about 60 minutes). The hydrocarbons in the mixed exhaust gas as well as the higher water content of the mixed exhaust gas oxidizes the Pd of the DOC such that a ratio of the PdO to Pd increases and a catalytic conversion efficiency of the DOC degrades. A diesel-only exhaust gas having a water content of 8% by volume (or approximately 8% by volume) is then flown through the DOC for a second time (e.g., about 20 minutes) while the DOC is still maintained at the operating temperature. The lower water content and lower hydrocarbon content of the diesel-only exhaust gas promotes the reduction of the PdO to Pd thereby regenerating the catalyst as described before herein.

Figure 5:
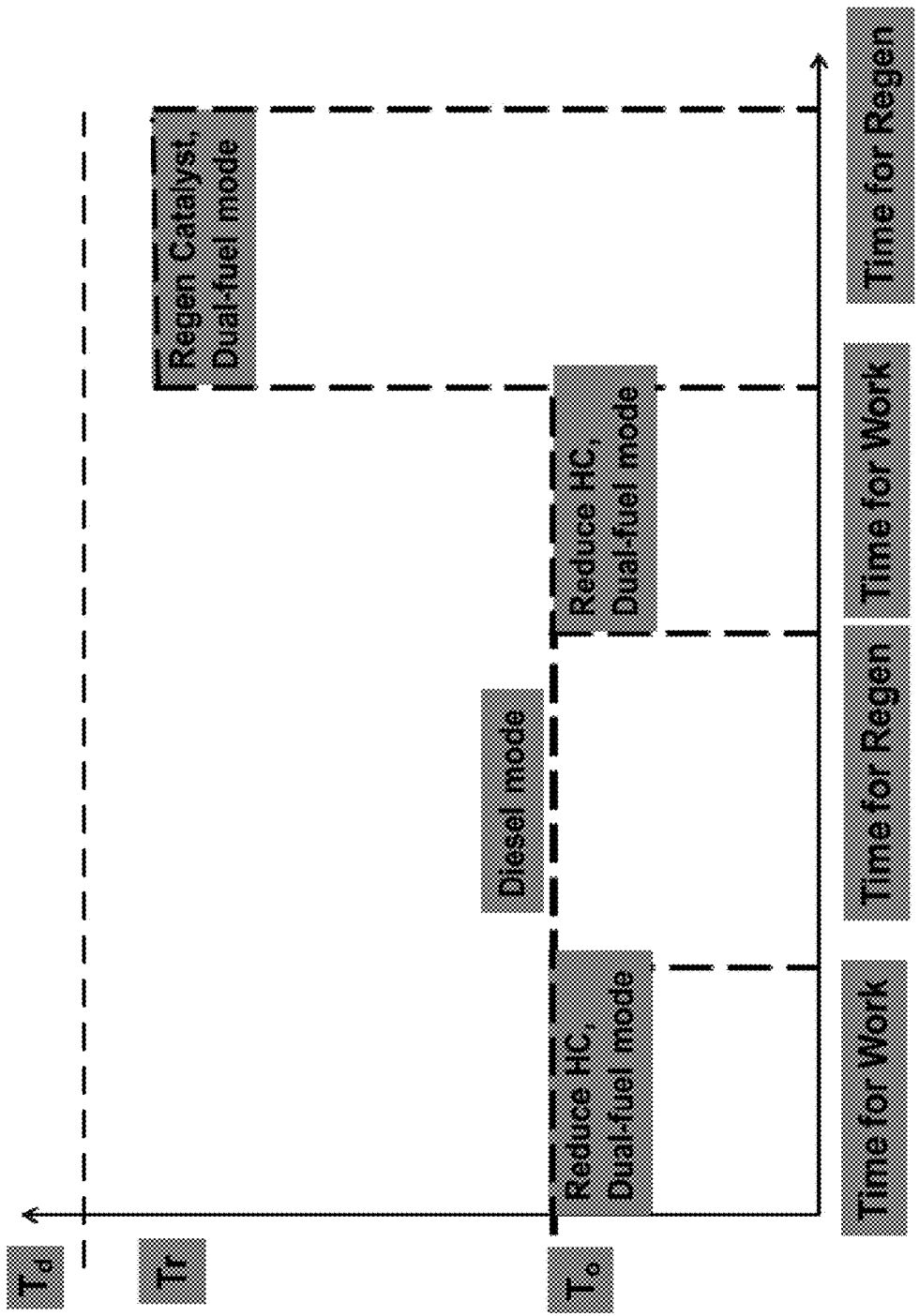
FIG. 5 is yet another timing diagram for regenerating the DOC using a combination of varying the temperature of the DOC, and alternately flowing a mixed exhaust gas and a diesel-only exhaust gas through the DOC.

FIG. 5 is an example of a timing diagram for regeneration a DOC using a combination of varying a temperature of the DOC as well as alternately flowing a mixed exhaust gas and a diesel-only exhaust gas over the DOC. With an engine (e.g., the engine 102) operating in dual-fuel mode, a mixed exhaust gas is flown through the DOC (e.g., the DOC 120), while the DOC is maintained at an operating temperature of the DOC for a first time. As described before, the higher water content and hydrocarbon content in the mixed exhaust gas promotes oxidation of the Pd to increase the ratio of PdO in the DOC relative to the Pd and thereby reducing the catalytic conversion efficiency of the DOC. A diesel-only exhaust gas is then flown through the DOC for a second time, with the DOC at the operating temperature to regenerate the DOC, as described above herein. The mixed exhaust gas is then flown through the DOC maintained at the operating temperature for a third time, which can be equal to the first time (e.g., about 60 minutes). While the mixed exhaust gas is still flowing through the DOC, a temperature of the DOC is raised to a regeneration temperature (e.g., about 600 degrees Celsius) and the DOC is maintained at the regeneration temperature for a fourth time, to regenerate the DOC, as described above. The fourth time can be equal to the second time or different therefrom. The cycle is then repeated.

Figure 6:
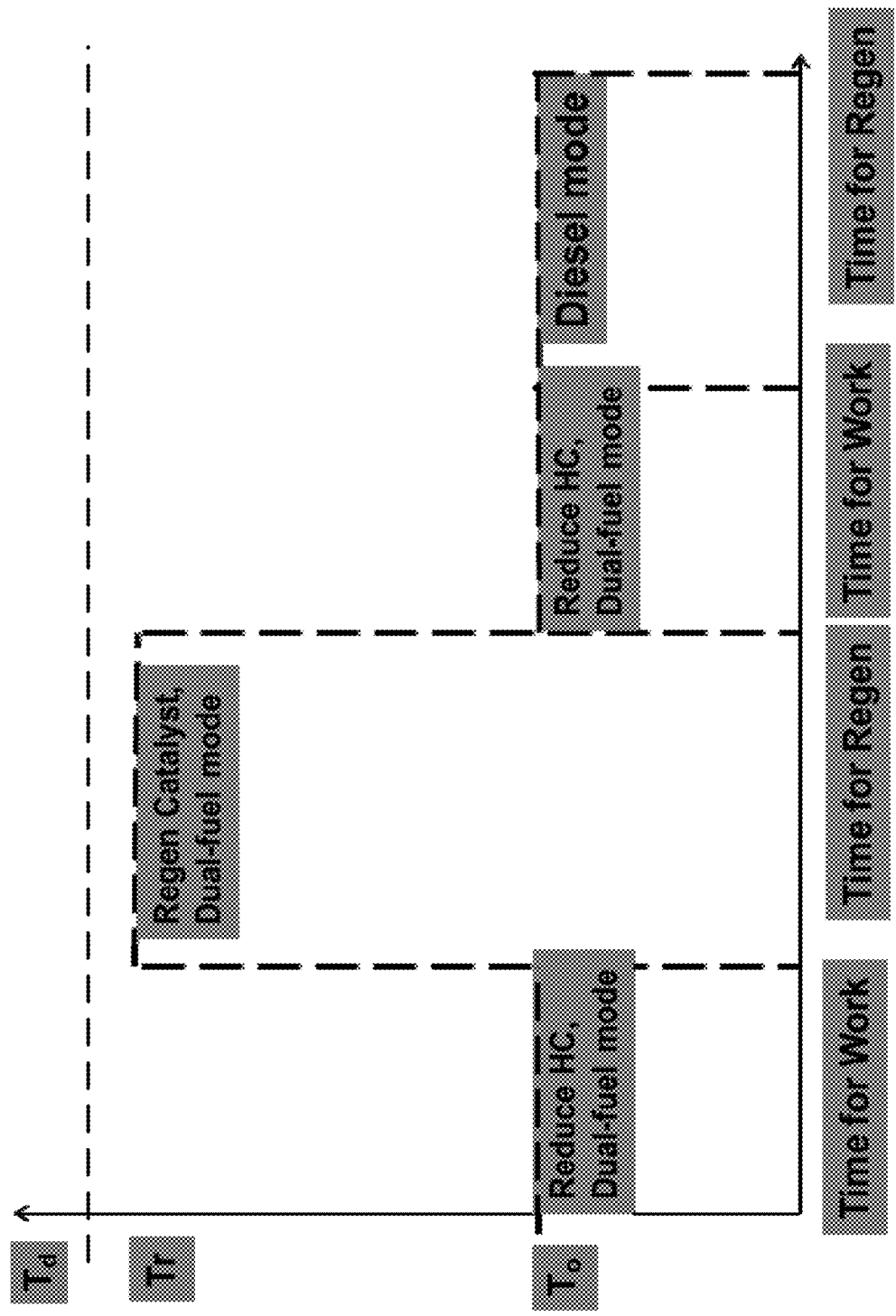
FIG. 6 is still another timing diagram for regenerating the DOC using a combination of varying the temperature of the DOC, and alternately flowing a mixed exhaust gas and a diesel-only exhaust gas through the DOC.

FIG. 6 is another example of a timing diagram for regenerating a DOC using a combination of varying a temperature of the DOC as well as alternately flowing a mixed exhaust gas and a diesel-only exhaust gas over the DOC. With an engine (e.g., the engine 102) operating in dual-fuel mode, a mixed exhaust gas is flown through the DOC (e.g., the DOC 120) while the DOC is maintained at an operating temperature of the DOC for a first time (e.g., for 60 minutes). While the mixed exhaust gas is still flowing through the DOC, a temperature of the DOC is raised to a regeneration temperature (e.g., about 600 degrees Celsius), and the DOC is maintained at the regeneration temperature for a second time (e.g., 20 minutes) to regenerate the DOC as described above. The temperature of the DOC is lowered to the operating temperature while the mixed exhaust gas is still flowing through the DOC, and the DOC is maintained at the operating temperature for a third time. The third time can be equal to the first time. A diesel-only exhaust gas is then flown through the DOC for a fourth time with the DOC at the operating temperature to regenerate the DOC, as described above herein. The fourth time can be equal to the second time or different therefrom. The cycle is then repeated.

Figure 7:
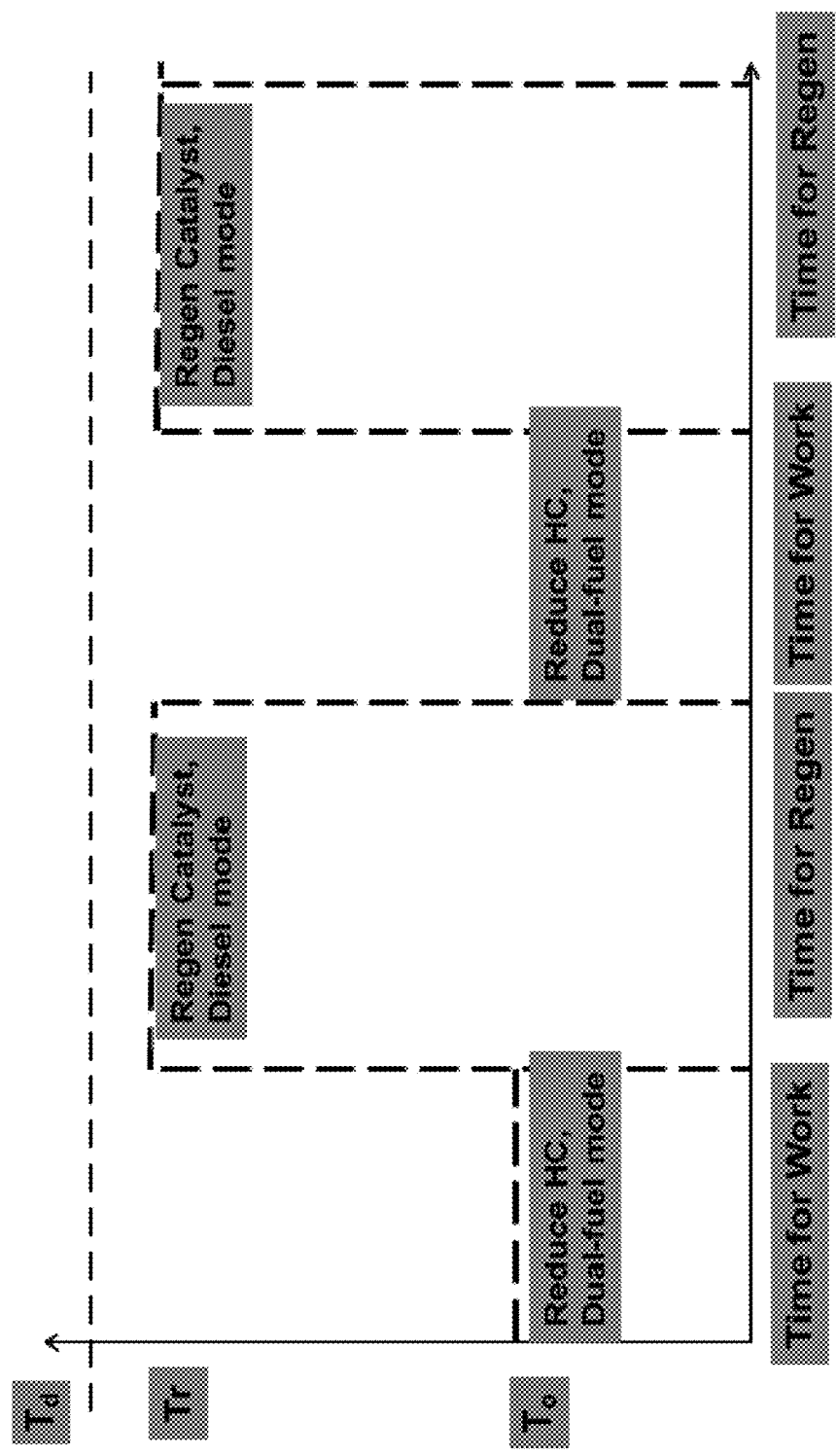
FIG. 7 is yet another timing diagram for regenerating the DOC using a combination of varying the temperature of the DOC, and alternately flowing a mixed exhaust gas and a diesel-only exhaust gas through the DOC.

FIG. 7 is yet another example of a timing diagram for regenerating a DOC using a combination of varying a temperature of the DOC as well as alternately flowing a mixed exhaust gas and a diesel-only exhaust gas over the DOC. With an engine (e.g., the engine 102) operating in dual-fuel mode, a mixed exhaust gas is flown through the DOC (e.g., the DOC 120) while the DOC is maintained at an operating temperature of the DOC for a first time (e.g., for 60 minutes). The temperature of the DOC is then raised to a regeneration temperature (e.g., 600 degrees Celsius), and simultaneously a diesel-only exhaust gas is flown through the DOC for a second time (e.g., 20 minutes) to regenerate the DOC. The temperature of the DOC is then lowered to a third temperature and a mixed exhaust gas is flown through the DOC maintained at the operating temperature for a third time. The third time can be equal to the first time. The temperature of the DOC is again raised to the regeneration temperature and simultaneously a diesel-only exhaust gas is also flown through the DOC for a for a fourth time to regenerate the DOC, which can be equal to the second time. The cycle is then repeated.

Figure 8:
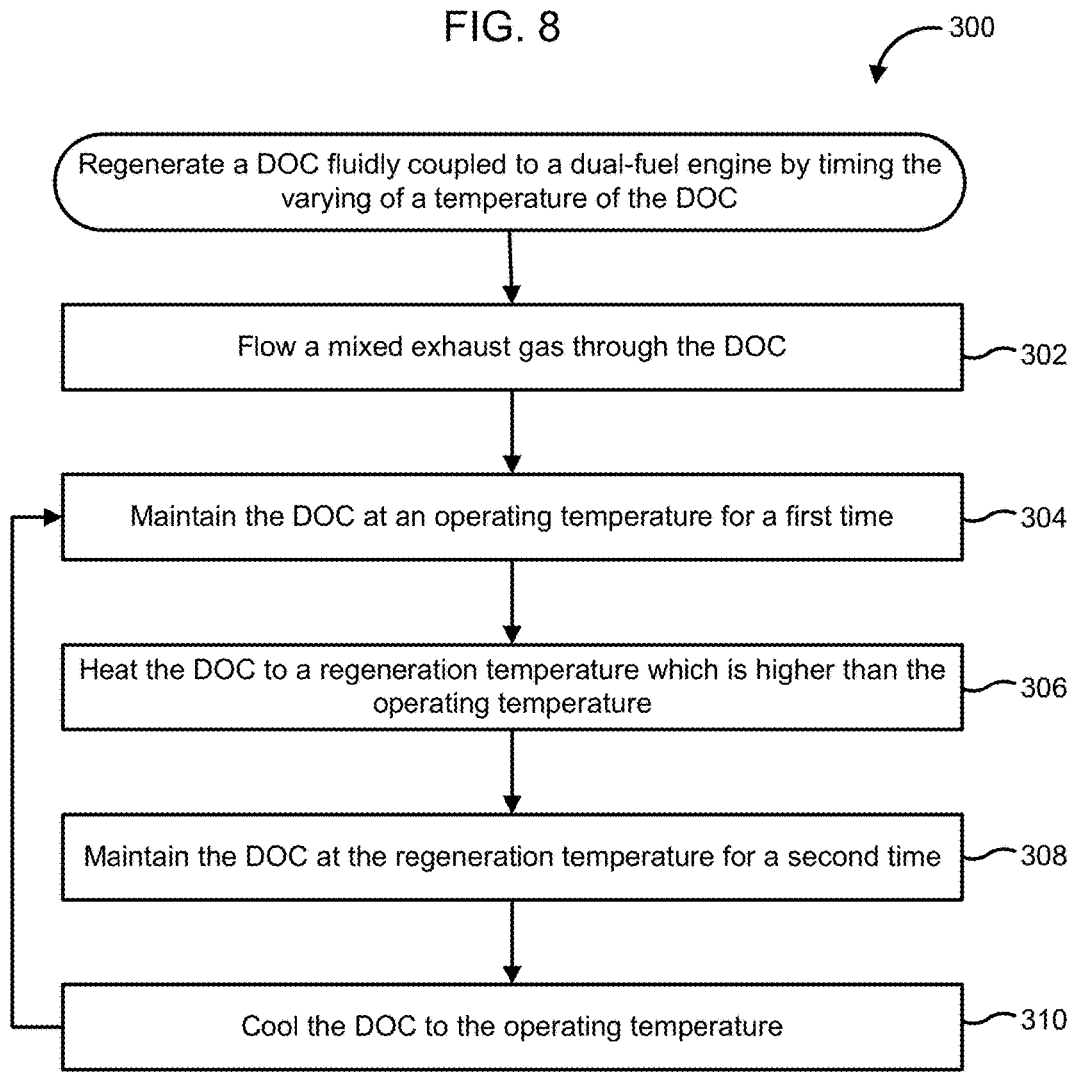
FIG. 8 is a schematic flow diagram of one embodiment of a method for regenerating a DOC included in an aftertreatment system fluidly coupled to a dual-fuel engine by varying the temperature of the DOC.

FIG. 8 is a schematic flow diagram of an exemplary method 300 for regenerating a DOC (e.g., the DOC 120) included in an aftertreatment system (e.g., the aftertreatment system 100) fluidly coupled to a dual-fuel engine (e.g., the engine 102) and configured to reduce hydrocarbons included in a mixed exhaust gas and/or diesel-only exhaust gas produced by the engine by timing the varying of a temperature of the DOC. The operations of the method 300 can be stored in the form of instructions on a non-transitory computer-readable medium (e.g., the main memory 536, read only memory (ROM) 538 or storage device 540 included in the computing device 530 of FIG. 11). The computer-readable medium can be included in a computing device (e.g., the computing device 530) which is configured to execute the instructions stored on the computer-readable medium to perform the operations of the method 300. In particular embodiments, the operations of the method 300 can be stored in a computer-readable medium included in the controller 170 or 270 and configured to be executed by the controller 170 or 270.

The method 300 includes flowing a mixed exhaust gas through the DOC at 302. The mixed exhaust gas includes a mixture of natural gas exhaust gas and diesel-only exhaust gas. For example, the controller 170 or 270 can instruct the fuel insertion assembly 104 to insert a mixture of natural gas and diesel into the engine 102 so that the engine produces the mixed exhaust gas which is flown through the DOC 120. The DOC is maintained at an operating temperature for a first time at 304. For example, the mixed exhaust gas flowing through the DOC 120 can have a temperature corresponding to an operating temperature of the DOC 120, for example less than 550 degrees Celsius. In other embodiments, the heater 126 operatively coupled to the DOC 120 can be instructed by the controller 170 to maintain the temperature of the DOC 120 at the operating temperature for the first time (e.g., 1 minute, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween). The DOC 120 oxidizes the hydrocarbons included in the mixed exhaust gas flowing the through the DOC 120 which increases the PdO to Pd ratio of the DOC 120, as described before herein and thereby causes a reduction in the catalytic conversion efficiency of the DOC 120.

The DOC is heated to a regeneration temperature which is higher than an operating temperature of the DOC at 306. For example, in particular embodiments, the controller 170 instructs the heater 126 to raise the temperature of the DOC to the regeneration temperature (e.g., about 600 degrees Celsius). In other embodiments, the controller 170 instructs the fuel insertion assembly 104 to alter a stoichiometric ratio of the natural gas to diesel inserted into the engine 102 such that the temperature of the exhaust gas increases to the regeneration temperature. The exhaust gas flowing through the DOC 120 also raises the temperature of the DOC 120 to the regeneration temperature.

The DOC is maintained at the operating temperature for a second time at 308. For example, the controller 170 instructs the heater 126 to maintain the temperature of the DOC 120 at the regeneration temperature for the second time (e.g., 10 seconds, 20 seconds, 30 second, 1, minute, 2 minutes, 5 minutes, 10 minutes, 15 minutes, 20 minutes, 25 minutes or 30 minutes inclusive of all ranges and values therebetween). The regenerating temperature promotes the reduction of the PdO included in the DOC 120 to Pd which balances the Pd to PdO ratio regenerating the catalyst, as described before herein. The DOC is cooled to the operating temperature at 310, and the method 300 then returns to operation 304.

Figure 9:
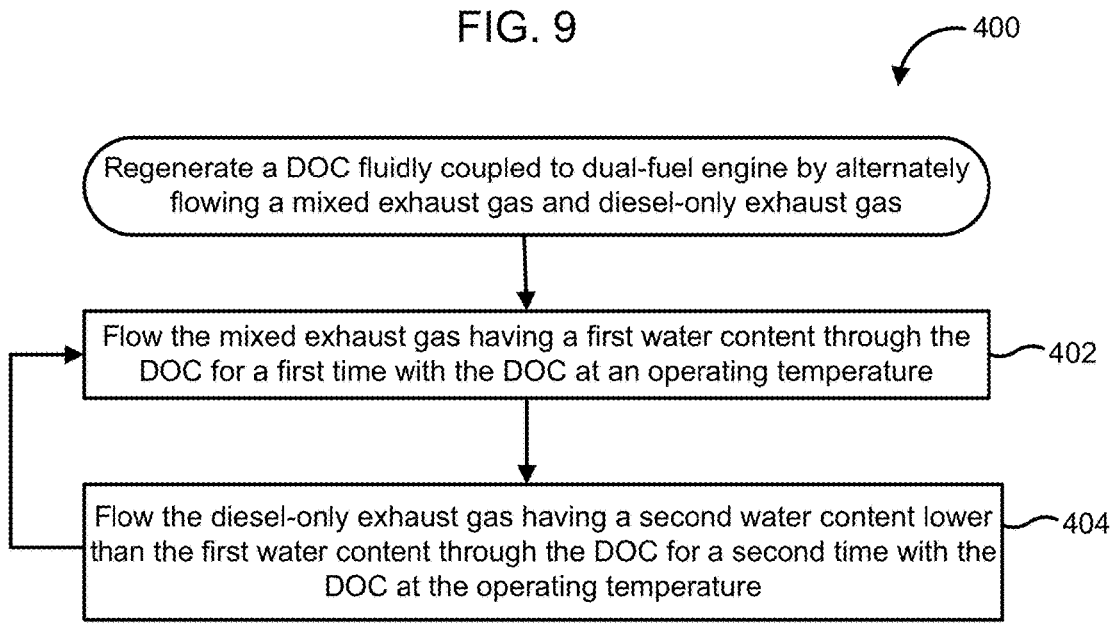
FIG. 9 is a schematic flow diagram of a another embodiment of a method for regenerating a DOC included in an aftertreatment system fluidly coupled to a dual-fuel engine by alternately flowing a mixed exhaust gas and a diesel-only exhaust gas through the DOC.

FIG. 9 is a schematic flow diagram of another exemplary method 400 for regenerating a DOC (e.g., the DOC 120) included in an aftertreatment system (e.g., the aftertreatment system 100) fluidly coupled to a dual-fuel engine (e.g., the engine 102) and configured to reduce hydrocarbons included in a mixed exhaust gas and/or diesel-only exhaust gas produced by the engine by alternately (a) flowing a mixed exhaust gas and (b) a diesel-only exhaust gas through the DOC. The operations of the method 400 can be stored in the form of instructions on a non-transitory computer-readable medium (e.g., the main memory 536, read only memory (ROM) 538 or storage device 540 included in the computing device 530 of FIG. 11). The computer-readable medium can be included in a computing device (e.g., the computing device 530) which is configured to execute the instructions stored on the computer-readable medium to perform the operations of the method 300. In particular embodiments, the operations of the method 400 can be stored in a computer-readable medium included in the controller 170 or 270 and configure to be executed by the controller 170 or 270.

The method 400 includes flowing a mixed exhaust gas having a first water content through the DOC for a first time with the DOC at an operating temperature at 402. For example, the controller 170 instructs the fuel insertion assembly 104 to insert a mixture of natural gas and diesel, for example, via the natural gas insertion assembly 106 and the diesel insertion assembly 108 into the engine 102. The mixture can include any predetermined ratio of natural gas to air, diesel to air and natural gas to diesel. In some embodiments, a lean mixture of the natural gas, diesel and air is inserted into the engine. This causes the engine 102 to generate the mixed exhaust gas, as described before herein. The mixed exhaust has a first water content, for example about 12% water by volume, and is flown through the DOC 120 for the first time (e.g., 1 minute, 2 minutes, 5 minutes, 10 minutes, 20 minutes, 30 minutes, 40 minutes, 50 minutes, 60 minutes, 70 minutes, 80 minutes, 90 minutes, 100 minutes, 110 minutes or 120 minutes inclusive of all ranges and values therebetween), with the DOC 120 maintained at the operating temperature (e.g., less than 550 degrees Celsius). The high water content as well as hydrocarbon content of the mixed exhaust gas promotes the oxidation of Pd to PdO thereby increasing the ratio of the PdO to Pd and reducing the catalytic conversion efficiency of the DOC 120, as described before herein.

The diesel-only exhaust gas having a second water content lower than the first water content is flown through the DOC for a second time with the DOC at the operating temperature at 404. For example, the controller 170 instructs the fuel insertion assembly 104 to insert only diesel into the engine 102 causing the engine 102 to generate the diesel-only exhaust gas. The diesel-only exhaust gas has a second water content, for example, 8% by volume which is lower than the first water content of the mixed exhaust gas. Furthermore, the diesel-only exhaust gas can also have a lower concentration of unburnt hydrocarbons. As the diesel-only exhaust gas flows through the DOC 120 for the second time (e.g., 10 seconds, 20 seconds, 30 second, 1, minute, 2 minutes, 5 minutes, 10 minutes, 15 minutes, 20 minutes, 25 minutes or 30 minutes inclusive of all ranges and values therebetween), the lower water and hydrocarbon content of the diesel-only exhaust gas promotes reduction of the PdO to Pd, balancing the Pd to PdO ratio and thereby, regenerating the catalyst as described before herein. The method 400 then returns to operation 404 and the cycle is repeated.

In various embodiments, the operations of the method 300 and 400 can be combined in any suitable combination to regenerate the DOC (e.g., DOC 120) using the benefits of timing the varying of the temperature of the DOC as well as alternately flowing the mixed exhaust gas and the diesel-only exhaust gas through the DOC (e.g., as described before with respect to the timing diagrams of FIGS. 3-7).

Figure 10:
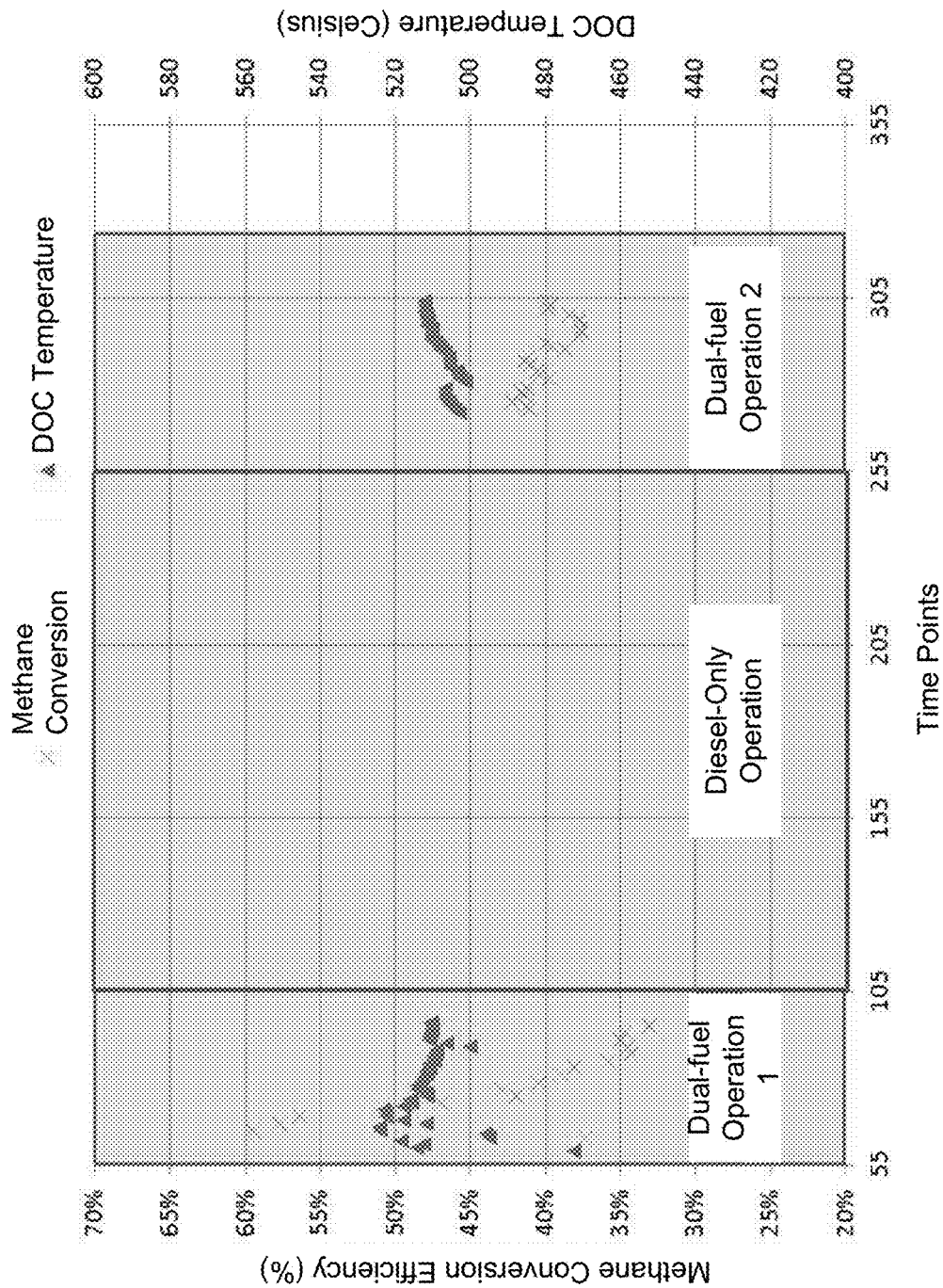
FIG. 10 is a scatter plot of methane conversion efficiency of a DOC fluidly coupled to a dual-fuel engine operating in dual-fuel mode such that a mixed exhaust is generated which flows through the DOC, and the methane conversion efficiency is regenerated by operating the dual-fuel engine in diesel-only mode such that a diesel-only exhaust gas is produced which flows through the DOC.

FIG. 10 is a scatter plot of test results obtained from a 19 L dual-fuel engine demonstrating regeneration of a Pd—PdO DOC included in an aftertreatment system fluidly coupled to the engine by alternately flowing a mixed exhaust gas a diesel-only exhaust gas through the DOC. The X-axis of the plot shows the data points collected at different time points during testing. The Y-axis on right hand side of the plot corresponds to the DOC temperature, while the Y-axis on left hand side corresponds to methane conversion efficiency of the DOC. Triangular points on the plot represent the DOC temperature. The temperature is almost constant at approximately 510 degrees Celsius, which is the operating temperature of the DOC. The cross-points on the plot represent the methane conversion efficiency of the DOC.

During the operating period or phase (also referred to herein as "dual-fuel operation 1"), the engine operates in dual-fuel mode for a first time and the methane conversion efficiency of the DOC decreases from 60% to 30%. The decrease in methane conversion efficiency can be attributed to oxidation of the Pd to PdO which increases the ratio of PdO to Pd in the DOC, as well as due to mild sulfation and surface hydroxyl groups masking over the DOC. After the dual-fuel operation 1 phase, the engine is shifted to diesel-only operation mode for a second time so the engine produces diesel-only exhaust gas which flows through the DOC for the second time. The engine is then shifted back to dual-fuel mode (the dual-fuel operation 2 phase in FIG. 10) and an increase in methane conversion efficiency of the DOC from 30% to 40% is observed. The engine test results demonstrate that alternately flowing the mixed exhaust gas and the diesel-only exhaust gas through the DOC helps to maintain the catalytic conversion efficiency of the catalyst.

Figure 11:
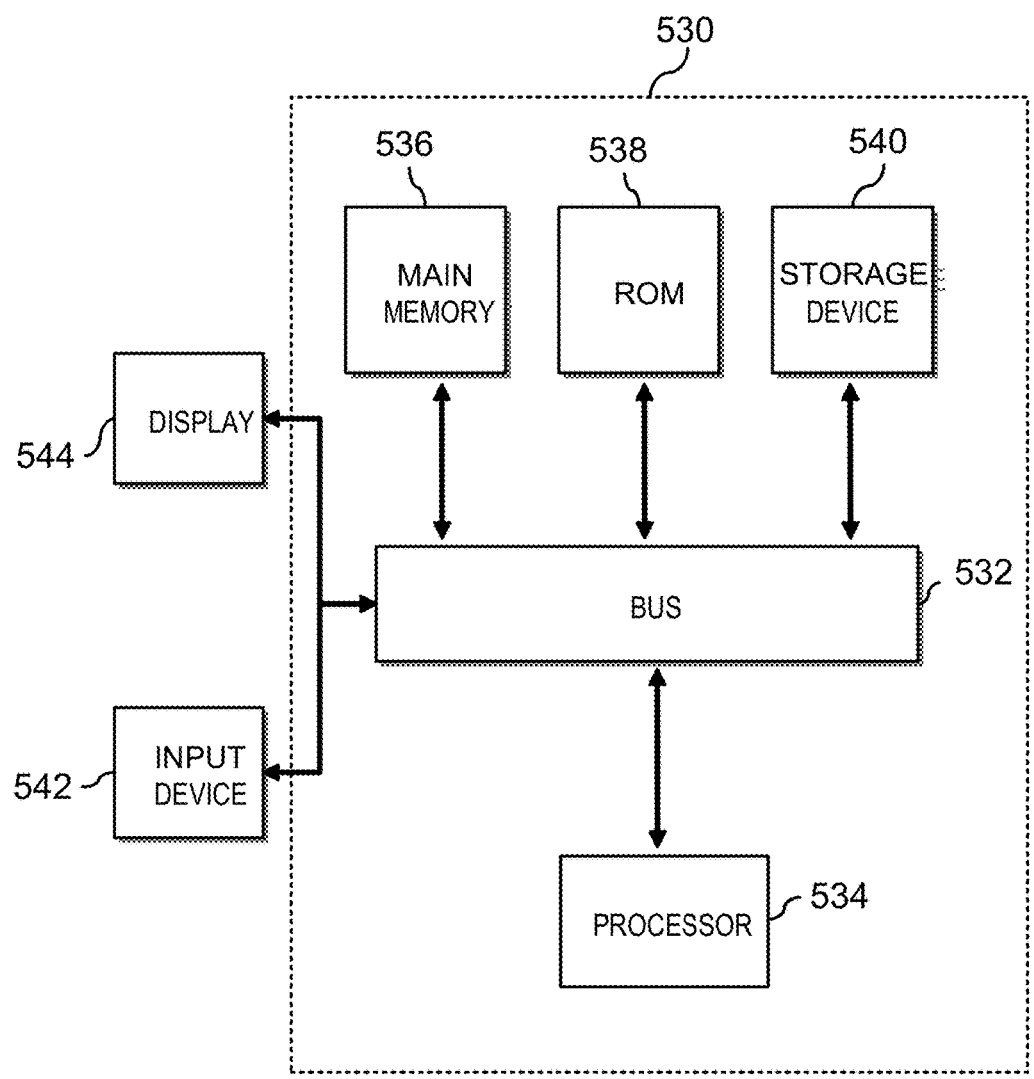
FIG. 11 is a schematic block diagram of a computing device which can be used as the controller of FIG. 1 and/or FIG. 2.

FIG. 11 is a block diagram of a computing device 530 in accordance with an illustrative implementation. The computing device can be used to perform any of the methods or the processes described herein, for example the method 300, 400 or any of the timing diagrams shown in FIGS. 3-7. In some embodiments, the controller 170 or 270 can include the computing device 530. The computing device 530 includes a bus 532 or other communication component for communicating information. The computing device 530 can also include one or more processors 534 or processing circuits coupled to the bus for processing information.

The computing device 530 also includes main memory 536, such as a random access memory (RAM) or other dynamic storage device, coupled to the bus 532 for storing information, and instructions to be executed by the processor 534. Main memory 536 can also be used for storing position information, temporary variables, or other intermediate information during execution of instructions by the processor 534. The computing device 530 may further include a read only memory (ROM) 538 or other static storage device coupled to the bus 532 for storing static information and instructions for the processor 534. A storage device 540, such as a solid-state device, magnetic disk or optical disk, is coupled to the bus 540 for persistently storing information and instructions. Instructions for timing the varying of the DOC temperature or alternately flowing the mixed exhaust gas and the diesel-only exhaust gas through or otherwise over the DOC can be stored in any one of the main memory 536 and/or storage device 540.

The computing device 530 may be coupled via the bus 532 to a display 535, such as a liquid crystal display, or active matrix display, for displaying information to a user. An input device 542, such as a keyboard or alphanumeric pad, may be coupled to the bus 532 for communicating information and command selections to the processor 534. In another implementation, the input device 542 has a touch screen display 544.

According to various implementations, the processes and methods described herein can be implemented by the computing device 530 in response to the processor 434 executing an arrangement of instructions contained in main memory 536 (e.g., the operations of the method 300 or 400). Such instructions can be read into main memory 536 from another non-transitory computer-readable medium, such as the storage device 540. Execution of the arrangement of instructions contained in main memory 536 causes the computing device 530 to perform the illustrative processes described herein.

One or more processors in a multi-processing arrangement may also be employed to execute the instructions contained in main memory 536. In alternative implementations, hard-wired circuitry may be used in place of or in combination with software instructions to effect illustrative implementations. Thus, implementations are not limited to any specific combination of hardware circuitry and software.

Although an example computing device has been described in FIG. 11, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A timing-based method for regenerating a diesel oxidation catalyst (DOC) in a DOC unit of an aftertreatment system fluidly coupled to a dual-fuel engine that generates a mixed exhaust gas comprising a mixture of a diesel-only exhaust gas and a natural gas exhaust gas, the method comprising:
   regenerating the DOC by, while flowing the mixed exhaust gas generated by the dual-fuel engine through the DOC unit, performing steps comprising:
      maintaining the DOC unit at an operating temperature for a first time while flowing a first mixed exhaust gas through the DOC unit, the first mixed exhaust gas being generated by inserting natural gas and diesel into the dual-fuel engine at a first ratio,
      heating the DOC unit to a regeneration temperature, the regeneration temperature being higher than the operating temperature by flowing a second mixed exhaust gas through the DOC unit, the second mixed exhaust gas being generated by inserting natural gas and diesel into the dual fuel engine at a second ratio that is different than the first ratio,
      maintaining the DOC unit at the regeneration temperature for a second time, and
      cooling the DOC unit
      wherein the first time is a time at which a catalytic conversion efficiency of the DOC drops from a maximum value to a minimum value while the DOC unit is maintained at the operating temperature and the first mixed exhaust gas is flowed through the DOC unit, and
      wherein the second time is a time at which a catalytic conversion efficiency of the DOC increases from the minimum value to the maximum value while the DOC unit is maintained at the regeneration temperature and the second mixed exhaust gas is flowed through the DOC unit.

2. The method of claim 1, wherein the DOC comprises a Pd—PdO catalyst.

3. The method of claim 1, wherein the regeneration temperature is higher than the operating temperature and an oxidation temperature of the DOC but lower than a decomposition temperature of the DOC.

4. The method of claim 3, wherein the regeneration temperature is higher than 550 degrees Celsius but lower than a decomposition temperature of the DOC.

5. The method of claim 4, wherein the regeneration temperature is 600 degrees Celsius.

6. The method of claim 1, wherein maintaining the DOC at the regeneration temperature also removes sulfur from the DOC.

7. An apparatus comprising:
   a fuel insertion assembly configured to selectively insert diesel, natural gas, or a mixture of diesel and natural gas into a dual-fuel engine;

an aftertreatment system configured to be fluidly coupled to the engine, the aftertreatment system comprising:
a diesel oxidation catalyst (DOC) unit containing a DOC, and
a temperature sensor; and
a controller in electrical communication with the fuel insertion assembly and the temperature sensor, the controller comprising a processor programmed to cause regeneration of the DOC by, while a mixed exhaust gas generated by the dual-fuel engine is flowing through the DOC unit, the mixed exhaust gas comprising a mixture of diesel-only exhaust gas and a natural gas exhaust gas, performing steps comprising:
causing the DOC unit to be maintained at an operating temperature for a first time while flowing a first mixed exhaust gas through the DOC unit, the first mixed exhaust gas being generated by inserting natural gas and diesel into the dual-fuel engine at a first ratio,
causing the DOC unit to be heated to a regeneration temperature, the regeneration temperature being higher than the operating temperature by flowing a second mixed exhaust gas through the DOC unit, the second mixed exhaust gas being generated by inserting natural gas and diesel into the dual fuel engine at a second ratio that is different than the first ratio,
causing the DOC unit to be maintained at the regeneration temperature for a second time, and
causing the DOC unit to be cooled
wherein the first time is a time at which a catalytic conversion efficiency of the DOC drops from a maximum value to a minimum value while the DOC unit is maintained at the operating temperature and the first mixed exhaust gas is flowed through the DOC unit, and
wherein the second time is a time at which a catalytic conversion efficiency of the DOC increases from the minimum value to the maximum value while the DOC unit is maintained at the regeneration temperature and the second mixed exhaust gas is flowed through the DOC unit.

8. The apparatus of claim 7, wherein the apparatus further comprises:
a heater operatively located in the DOC unit and in electrical communication with the controller.

9. The apparatus of claim 8, wherein the processor is programmed to instruct the heater to maintain the DOC unit at the operating temperature, heat the DOC unit to the regeneration temperature and cool the DOC unit.

10. The apparatus of claim 7, wherein the DOC includes at least one of a platinum group metal catalyst and a palladium-palladium oxide (Pd—PdO) catalyst.

11. The apparatus of claim 7, wherein the regeneration temperature is higher than the operating temperature and an oxidation temperature of the DOC but lower than a decomposition temperature of the DOC.

12. The apparatus of claim 7, wherein the aftertreatment system further comprises:
a selective catalytic reduction system positioned upstream or downstream of the DOC unit, the selective catalytic reduction system including at least one catalyst configured to reduce constituents of the exhaust gas.

13. A controller comprising a processor programmed to:
measure a temperature of a diesel oxidation catalyst (DOC) unit that contains a DOC and is included in an aftertreatment system configured to be fluidly coupled to a dual-fuel engine that generates a mixed exhaust gas comprising a mixture of a diesel-only exhaust gas and a natural gas exhaust gas; and
cause regeneration of the DOC by, while the mixed exhaust gas generated by the dual-fuel engine is flowing through the DOC unit, performing steps comprising:
causing the DOC unit to be maintained at an operating temperature for a first time while flowing a first mixed exhaust gas through the DOC unit, the first mixed exhaust gas being generated by inserting natural gas and diesel into the dual-fuel engine at a first ratio,
causing the DOC unit to be heated to a regeneration temperature, the regeneration temperature being higher than the operating temperature by flowing a second mixed exhaust gas through the DOC unit, the second mixed exhaust gas being generated by inserting natural gas and diesel into the dual fuel engine at a second ratio that is different than the first ratio,
causing the DOC unit to be maintained at the regeneration temperature for a second time, and
causing the DOC unit to be cooled,
wherein the first time is a time at which a catalytic conversion efficiency of the DOC drops from a maximum value to a minimum value while the DOC unit is maintained at the operating temperature and the first mixed exhaust gas is flowed through the DOC unit, and
wherein the second time is a time at which a catalytic conversion efficiency of the DOC increases from the minimum value to the maximum value while the DOC unit is maintained at the regeneration temperature and the second mixed exhaust gas is flowed through the DOC unit.

14. The controller of claim 13, wherein the DOC includes a palladium-palladium oxide (Pd—PdO) catalyst.

15. The controller of claim 13, wherein the regeneration temperature is higher than an oxidation temperature of the DOC but lower than a decomposition temperature of the DOC.

16. A timing-based method for regenerating a diesel oxidation catalyst (DOC) in a DOC unit of an aftertreatment system fluidly coupled to a dual-fuel engine that generates a mixed exhaust gas comprising a mixture of a diesel-only exhaust gas and a natural gas exhaust gas, the method comprising:
regenerating the DOC by, while maintaining a temperature of the DOC unit at an operating temperature below 550° C., performing steps comprising:
alternately (a) flowing the mixed exhaust gas generated by the dual-fuel engine through the DOC unit for a first time, the mixed exhaust gas having a first water content and (b) flowing a diesel-only exhaust gas generated by the dual-fuel engine through the DOC unit for a second time sufficient to regenerate the DOC, the diesel-only exhaust gas having a second water content smaller than the first water content.

17. The method of claim 16, wherein the DOC is maintained at an operating temperature of the DOC during the first time and the second time.

18. An apparatus comprising:
a fuel insertion assembly configured to selectively insert diesel, natural gas, or a mixture of diesel and natural gas into a dual-fuel engine;
an aftertreatment system configured to be fluidly coupled to the engine, the aftertreatment system comprising:

a diesel oxidation catalyst (DOC) unit containing a DOC, and a temperature sensor; and a controller in electrical communication with the fuel insertion assembly and the temperature sensor, the controller comprising a processor programmed to cause regeneration of the DOC by, while maintaining a temperature of the DOC unit at an operating temperature below 550° C., performing steps comprising:

instructing the fuel insertion assembly to alternately (a) insert the mixture of diesel and natural gas at a predetermined ratio into the dual-fuel engine to generate a mixed exhaust gas comprising a mixture of a diesel-only exhaust gas and a natural gas exhaust gas which flows through the DOC unit for a first time, the mixed exhaust gas having a first water content, and (b) insert only diesel into the dual fuel engine to produce diesel-only exhaust gas which flows through the DOC unit for a second time sufficient to regenerate the DOC, the diesel-only exhaust gas having a second water content smaller than the first water content.

19. The apparatus of claim 18, wherein the DOC is maintained at an operating temperature of the DOC during the first time and the second time.

20. A controller comprising a processor programmed to:

measure a temperature of a diesel oxidation catalyst (DOC) unit that contains a DOC and is included in an aftertreatment system configured to be fluidly coupled to a dual-fuel engine; and cause regeneration of the DOC by, while maintaining a temperature of the DOC unit at an operating temperature below 550° C., performing steps comprising:

instructing a fuel insertion assembly to alternately (a) insert a mixture of diesel and natural gas at a predetermined ratio into the dual-fuel engine to generate a mixed exhaust gas comprising a mixture of a diesel-only exhaust gas and a natural gas exhaust gas which flows through the DOC unit for a first time, the mixed exhaust gas having a first water content, and (b) insert only diesel into the dual fuel engine to produce diesel-only exhaust gas which flows through the DOC unit for a time sufficient to regenerate the DOC, the diesel-only exhaust gas having a second water content smaller than the first water content.

21. The controller of claim 20, wherein the DOC is maintained at an operating temperature of the DOC during the first time and the second time.

* * * * *